March 30, 1954  E. J. BASTIN  2,673,626
LOCKING DEVICE FOR X-RAY APPARATUS
Filed May 29, 1950
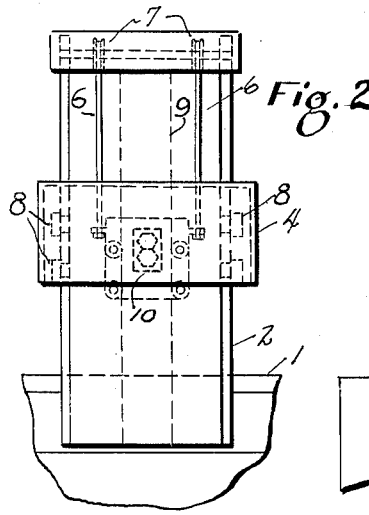
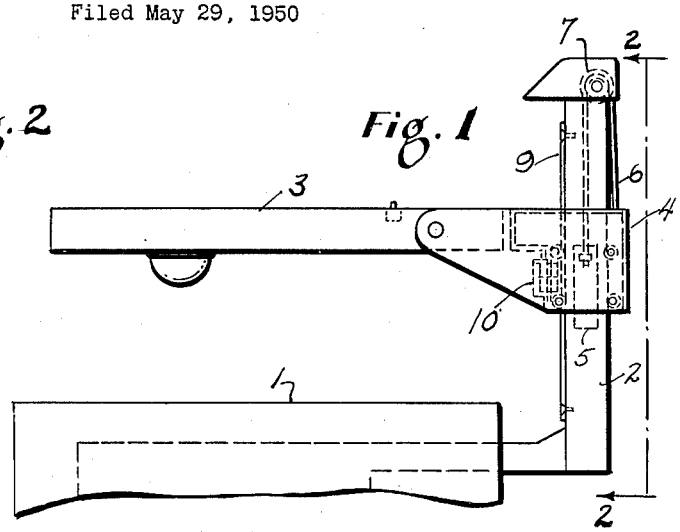
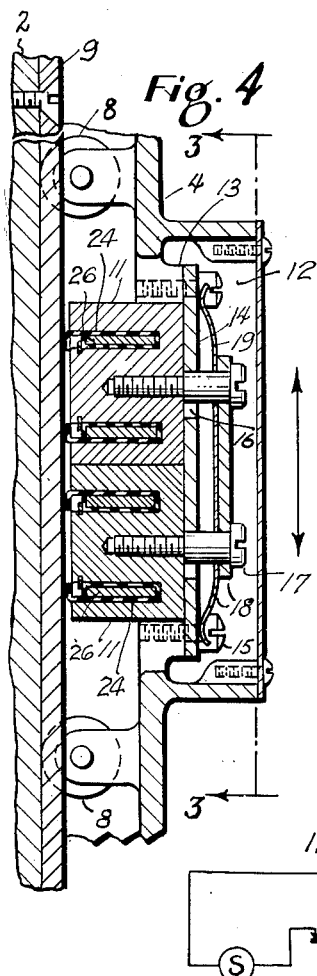
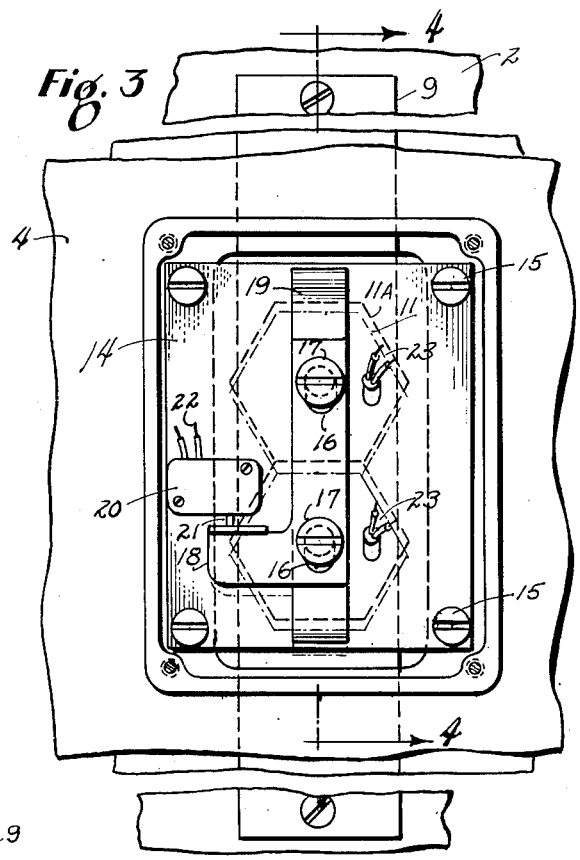
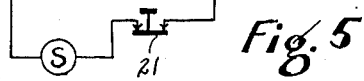
INVENTOR
EDGAR J. BASTIN
BY Bates, Teare & McBean
Attorneys Patented Mar. 30, 1954

2,673,626

UNITED STATES PATENT OFFICE 2,673,626

LOCKING DEVICE FOR X-RAY APPARATUS

Edgar J. Bastin, Cleveland, Ohio, assignor to Picker X-Ray Corporation, Waite Manufacturing Division, Inc., Cleveland, Ohio, a corporation of Ohio Application May 29, 1950, Serial No. 164,882

11 Claims. (Cl. 188—165)

This invention relates generally to X-ray apparatus and more particularly to an automatic electro-magnetic type lock for X-ray apparatus.

The various techniques employed in operating an X-ray apparatus diagnosis usually require that the apparatus be constructed of a plurality of cooperating, relatively movable members which may be shifted to different positions individually or in combination in accordance with the particular technique employed. Although some techniques require continuous relative movement between the members during observation or examination, the more usual type of technique requires a predetermined setting of certain of the members relative to each other. Accordingly, means must be provided for arresting the relative movements quickly and accurately in accordance with the required control. Furthermore, the arresting means must have positive locking action to maintain the accuracy of settings and to prohibit subsequent disalignment.

Heretofore, various types of mechanical locks in the form of screw or toggle mechanisms have been utilized for this purpose in X-ray apparatus. Some mechanical locks, however, do not conform to the desired characteristics inasmuch as they require periodic adjustment and alignment, and are not quick-acting. Furthermore, the mechanical nature of such locks require that they be closely associated with the particular member or element they are controlling, thus, resulting in a plurality of widely separated mechanical locks throughout the apparatus which increases the burden of operation by reason of their inconvenient location.

In some instances, the technique of operation requires that the movable element such as a fluoroscopic unit be free to move in one direction and not in another. In such cases, the locking mechanism takes the form of a ratchet and pawl arrangement which requires adjustment and compensation for wear and mis-alignment. By utilizing an electro-magnetic type lock it is possible to obtain remote centralized control of the various locks and at the same time substantially reduce the periodic adjustments and maintenance which are inherent in the operation of mechanical type locks.

Accordingly, it is an object of this invention to provide an electro-magnetic type lock which will allow movement of one member relative to another in a given direction and at the same time automatically restrain movement thereof in some other direction.

Another object of this invention is to provide an electro-magnetic type lock which will allow movement of a movable member relative to another in one direction and automatically restrain movement in the other direction and which requires a minimum of adjustment and maintenance.

Briefly, in accordance with this invention, a magnet and associated energizing coil are mounted on a movable member adjacent a relatively fixed member which carries a magnetically susceptible guide throughout the distance of movement of the movable member parallel to the fixed member. The magnet is loosely mounted for slight displacement in directions parallel and normal to the member movement and carries a switch arm which is adapted to close a switch to energize the magnet coil when the magnet is moved in one direction, thereby causing the magnet to be attracted to the magnetically susceptible guide and arrest further movement of the movable member in that direction.

In the drawing, Fig. 1 shows a partial assembly of an X-ray apparatus and illustrates a fluoroscope unit mounted for movement along a supporting column adjacent an X-ray table; Fig. 2 is a rear view of the fluoroscope supporting column taken along the lines 2—2 in Fig. 1; Fig. 3 is an expanded view of the automatic magnetic lock assembly mounted on a cut-away portion of the fluoroscope carriage and supporting column taken along the lines 3—3 in Fig. 4; Fig. 4 is a section of the magnetic lock assembly taken along the lines 4—4 in Fig. 3; Fig. 5 is a circuit diagram of one embodiment of the control circuit for the automatic electro-magnetic lock.

Referring to Fig. 1, a partial assembly of an X-ray apparatus is illustrated in the form of a table 1 which carries a fluoroscope supporting column 2 for supporting a fluoroscopic unit 3 on a carriage 4. The carriage 4 is mounted for vertical motion along the supporting column 2, and a suitable counter-balancing system is provided to balance the movement along the column. The system includes a counterweight 5 which is connected to the carriage 4 by a cable 6 which is looped over a pulley 7 on the top or tower of the supporting column 2. Suitable rollers 8 are provided for the carriage which cooperate with track on the supporting column 2.

An automatic electro-magnetic lock assembly, indicated generally by the dotted lines 10, is mounted within the carriage 4 adjacent a magnetically susceptible track 9 running vertically along the column 2 throughout the total distance of movement of the carriage and fluoroscopic unit. The magnetically susceptible track 9 may be made of steel or any other suitable magnetic material which can be magnetized by the traverse of magnetic flux and thereby cooperate as a fixed armature with the electromagnetic lock assembly 10.

An expanded front view of the electro-magnetic lock assembly is shown in Fig. 3 and a section of this expanded view is shown in Fig. 4 to illustrate the detailed construction of the lock assembly and its operation in the X-ray apparatus shown in Fig. 1. Referring now to Figs. 3 and 4, one or more magnets 11 having energizing coils 26 are mounted within the carriage 4 adjacent the track 9. The carriage has an annular expanded portion 12 forming a housing for the magnet mounting assembly.

The mounting assembly includes an integral boss 13 which extends within the housing 12 and supports a mounting plate 14 on bolts 15. The plate 14 has a number of holes 16 therethrough for receiving magnet securing bolts 17 which are adapted to secure the magnets 11 on the mounting plate 14 adjacent the track 9. A cooperating switch arm 18 is also supported by the bolts 17 on the other side of the mounting plate 14.

It will be noted that the bolt openings 16 in the mounting plate 14 are larger than the corresponding bolts 17, thus enabling slight relative displacement between the magnets 11 and the mounting plate 14 on the carriage 4 in a direction parallel to the carriage movement as will be hereinafter more fully described.

Provision is also made to allow slight displacement of the magnets 11 in a direction normal to the mounting plate 14 to enable the magnets to be attracted to the track 9 when energized. In order to accomplish this, I have provided a smooth shank portion on the bolts 17 between the head and threaded ends which has a greater length than the supporting cross-section of the mounting plate 14. Restraining means in the form of a resilient member 19 is positioned on the bolts between the switch arm 18 and the mounting plate 14. When the magnets 11 are not energized the member 19 coacts with the switch arm 18 and mounting plate 14 to retain the magnets against the mounting plate in spaced relation from the track 9. However, when energized, the magnetic attraction between the magnets 11 and the track 9 is sufficient to overcome the restraining force of the member 19 and the magnets 11 are displaced towards the track 9 where they adhere in magnetic locking relation until deenergized.

The switch arm 18 cooperates with suitable switch contacts (not shown) to close or open the magnet energizing circuit. As best shown in Fig. 3, the switch contacts are enclosed in a casing 20 which is mounted on the mounting plate 14 in operative relation with the cooperating switch 21 on the switch arm 18. Suitable electrical connections 22 and 23 extend from the switch housing 20 and from the magnet 11 respectively. The dotted lines 11 and 11A in Fig. 3, illustrate the hexagonal cross section of the magnets 11 which are supported within corresponding hexagonal openings in the boss 13 within the carriage 4 to prevent relative rotation between the magnets and other associated members and thereby prevent twisting of the circuit connections 23.

In their preferred form, the magnets 11 may be provided with a neoprene cover 24 which projects beyond the face of the magnet adjacent the track 9 and which may preferably be made in the form of a cylinder to insulate the coil from magnet core. The neoprene cover 24, in addition to insulating the coils, provides an improved braking or arresting surface for the magnets 11 over that which may be obtained with metal to metal contact due to a greater coefficient of friction between the neoprene cover and the track 9. The slight spacing between the neoprene cover and the magnet face results in a mushroom-type action which provides a greater gripping power so that when the magnets 11 are deenergized and the neoprene cover is returning to its original state, the cover acts as a spring and lifts the magnet free of the track, thereby offsetting any undesirable effects of residual magnetism in the magnet cores.

In operation, the fluoroscopic unit 3 may be positioned vertically with respect to the table 1 by moving the carriage along the column 2 in the direction of the arrows of Fig. 4. The loose mounting of the magnets 11 on the mounting plate 14 enables a relative displacement between the magnets 11 and the carriage 4 as shown at 11A. Consequent upon movement of the carriage, the displacement is in a direction opposed to the contemporaneous movement of the carriage due to inertia of the magnets and the frictional resistance of the neoprene cover 24 on the track 9. This relative displacement is a significant feature of the invention which, in a given direction, enables the switch 21 to automatically close the energizing circuit of Fig. 5 and thereby energize the magnets 11 to effect a mutual magnetic attraction between the magnets and the track 9 and arrest further motion of the carriage 4 in the corresponding contemporaneous direction. In the drawings, the switch arm and switch contacts are shown mounted so that downward displacement of the magnets 11 will close the circuit and thereby arrest or prevent upward movement of the carriage. A similar opposed displacement of the magnets results when the carriage 4 is moved in the downward direction causing the switch 21 to open the energizing circuit of Fig. 5 and to deenergize the magnets 11. The magnetic attraction between the magnets 11 and the track 9 is thereby removed and, with the aid of the neoprene cover 24, the magnets 11 are released from magnetic locking relation with the track 9, permitting free movement of the carriage in the corresponding contemporaneous direction.

The resultant combined action of the automatic electromagnetic lock assembly in the X-ray apparatus illustrated corresponds to a mechanical ratchet and pawl arrangement which permits motion of the carriage 4 in one direction and automatically restricts motion in another direction.

By way of an exemplary explanation, the device of this invention is illustrated as applied to an X-ray apparatus employed in making fluoroscopic and spot film examinations of patients, particularly in the study of the stomach where barium meal is forced in to position within the stomach and held there during exposure to the X-rays. The technique is usually performed by palpitating the stomach to make certain that the radio opaque media flows where desired, and holding the media in the desired position by means of a compression cone mounted on the fluoroscopic unit. The compression cone is in the path of the central X-ray beam and must be locked against the patient in the desired position during exposure.

Heretofore, spot film and fluoroscopic devices have been equipped with a ratchet so that as the device is moved toward the table or patient it is a free wheeling device, yet as the patient resists the compression, the device is automatically locked. The use of the automatic electro-magnet assembly of this invention allows the X-ray operator to apply compression in a normal manner and the moment the desired position is obtained, the spot film device is automatically restrained in that position. The automatic electro-magnetic lock assembly of this invention is quick-acting and has relatively few moving parts, thus eliminating the necessity of frequent periodic adjustments and compensation for wear and misalignment.

I have shown and described what I consider the preferred embodiment of my invention along with suggested modifications and it will be obvious to those skilled in the art that other changes and modifications, particularly with respect to the construction of the electro-magnetic lock and its cooperation with the controlling switch to automatically arrest various movements in an X-ray apparatus, may be made without departing from the scope of my invention as defined by the appended claims.

I claim:

1. In an X-ray apparatus having a stationary member and another member mounted for movement along said stationary member, an electromagnet carried by said movable member for limited displacement parallel and transverse to the direction of movement, said stationary member having a magnetically susceptible guide adjacent the desired relative positions of said movable member in sliding contact with said electromagnet, and electrical means coacting with said electromagnet and guide in one displaced position of the electro-magnet to automatically energize said electromagnet and effect mutual magnetic attraction between said electromagnet and guide to arrest movement of said movable member in one direction only.

2. In an X-ray apparatus having a stationary member and another member mounted for movement along said stationary member, a magnet having an energizing coil mounted on said movable member, said stationary member having a magnetically susceptible guide adjacent the desired relative positions of said movable member and in sliding contact with said magnet, and electrical means coacting therewith to automatically energize said coil consequent upon movement of said movable member in one direction along said stationary member and thereby effect mutual magnetic attraction between said magnet and guide to arrest further movement of said movable member relative to said stationary member in that direction.

3. An apparatus comprising in combination a stationary member and another member mounted for movement along said stationary member, a magnet having an energizing coil, means loosely mounting said magnet and coil on said movable member for limited displacement parallel to the direction of movement and towards and away from the stationary member, said stationary member having a magnetically susceptible guide adjacent the desired relative positions of said movable member, means effecting a sliding contact between said guide and said magnet, an electrical energizing circuit for said coil, a switch in said circuit having a switch arm carried by said magnet for coaction with said means effecting a sliding contact, switch contacts associated therewith adapted to coact with said switch arm to thereby close said circuit consequent upon movement of said movable member in one direction along the stationary member, thereby energizing said magnet and restraining further movement in that direction.

4. In an X-ray apparatus having a stationary member and another member mounted for movement along said stationary member for limited displacement parallel and transverse to the direction of movement, an electromagnet carried by said movable member, said stationary member having a magnetically susceptible guide adjacent the desired relative positions of said movable member and in sliding contact with said electromagnet, electrical energizing means therefor, circuit switch means coacting with said electro-magnet and guide consequent upon movement of said movable member in one direction to energize said lock and arrest further movement in that direction and coacting with said electromagnet and guide consequent upon movement in another direction to de-energize said lock and allow free movement in that direction.

5. In an X-ray apparatus having a stationary member and another member mounted for movement along said stationary member, a magnet having an energizing coil, means supporting said magnet on said movable member allowing limited displacement between said magnet and movable member parallel and normal to the direction of movement of said movable member consequent upon said movement, said stationary member having a magnetically susceptible guide adjacent desired relative positions of said magnet and movable member and in sliding contact with said magnet, an electrical energizing circuit for said coil, switch means in said circuit including a switch arm carried by said magnet, switch contacts on said movable member adjacent the switch arm, said switch arm coacting with said switch contact to automatically energize said coil consequent upon displacement of said magnet in one direction parallel to said movement to arrest further movement of said movable member in the opposite direction, and coacting therewith to automatically de-energize said coil upon displacement of said magnet in another direction to allow free motion of said movable member in a direction opposite to said magnet displacement.

6. An X-ray apparatus having a supporting column and a supporting carriage mounted for movement along said column, an electromagnet carried by said carriage for limited displacement parallel and transverse to the direction of movement, a magnetically susceptible guide on said column adjacent the desired relative positions of said carriage and in sliding contact with said electromagnet, electrical energizing means for said electromagnet, and switch means coacting with said electromagnet and guide in one parallel displaced position of said electromagnet to automatically energize said electromagnet to effect mutual magnetic attraction between said electromagnet and guide consequent upon movement of said carriage in one direction to arrest further movement in that direction .

7. In an X-ray apparatus having a supporting column and a supporting carriage mounted for motion along said column, an electromagnet carried by said carriage for limited displacement parallel and transverse to the direction of movement, a magnetically susceptible guide on said column adjacent the desired relative positions of said carriage and in sliding contact with said electromagnet, electrical energizing means for said electromagnet, and switch means coacting with said electromagnet and guide to energize said electromagnet to effect mutual magnetic attraction between said electromagnet and guide consequent upon movement of said carriage in one direction to arrest further movement of the carriage in that direction and coacting therewith to deenergize said electromagnet consequent upon movement of said carriage in the other direction to allow free motion thereof in that direction.

8. In an X-ray apparatus having a supporting carriage mounted for motion along a column, said column having a magnetically susceptible track throughout the distance of movement of said carriage, a magnet and associated energizing coil mounted within said carriage adjacent said track and adapted upon energization for displacement towards contact with said track, means also effecting limited displacement of said magnet relative to said carriage and track in a direction parallel and opposite to the direction of movement of said carriage, an electrical energizing circuit for said coil, switch means carried by said carriage coacting with said magnet upon displacement of said magnet in one direction parallel to said carriage movement to energize said coil and cause the magnet to adhere to said track and thereby arrest further motion of said carriage in a corresponding direction.

9. In an X-ray apparatus having a supporting column and a supporting carriage mounted on rollers for movement along said column, said column having a magnetically susceptible track through-out the distance of movement of said carriage thereon, a magnet and associated energizing coil carried within said carriage adjacent said track, said magnet having one face in sliding contact with said track, means mounting said magnet within the carriage allowing limited displacement of said magnet relative to said carriage in directions parallel and normal to said carriage movement consequent upon said carriage movement, an electrical energizing circuit for said coil, switch means in said circuit including a switch arm carried by said magnet, cooperating switch contacts mounted on the carriage in operative relation adjacent said switch arm, said switch arm automatically coacting with said switch contacts consequent upon displacement of said magnet relative to the carriage in one direction to energize said coil and cause the magnet to be attracted and adhere to said track and thereby arrest further corresponding motion of said carriage along the column.

10. A uni-directional electro-magnetic lock comprising, a magnetically susceptible guide armature, an electro-magnet, means supporting said electro-magnet for movement along and transversely to said guide armature, means intermediate said electro-magnet and guide armature effecting a sliding contact therebetween, and electrical means coacting with said electromagnet and guide armature to automatically energize said electro-magnet responsive to movement of said electro-magnet in one direction along said guide and thereby arrest further movement in said one direction.

11. A uni-directional electro-magnetic lock comprising, a magnetically susceptible guide, a member adapted to be moved along said guide, an electro-magnet carried by said member for limited displacement parallel to the direction of movement and towards and away from the guide, means coacting between said electro-magnetic and guide to effect a sliding contact therebetween, and electrical means coacting between said member and the electro-magnet in one parallel displaced position of the electro-magnet to automatically energize said electro-magnet and thereby arrest movement of the magnet and member in one direction along said guide.

EDGAR J. BASTIN.

References Cited in the file of this patent

UNITED STATES PATENTS

| Number | Name | Date |
|---|---|---|
| 704,603 | Wadsworth | July 15, 1902 |
| 2,005,035 | Houtman | June 18, 1935 |
| 2,103,354 | Farmer | Dec. 28, 1937 |
| 2,154,524 | Nelson | Apr. 18, 1939 |
| 2,343,846 | Robinson | Mar. 7, 1944 |
| 2,495,106 | Kes | Jan. 17, 1950 |